Dec. 15, 1942.  G. C. FIELDS  2,305,151
VALVE
Filed Aug. 27, 1940
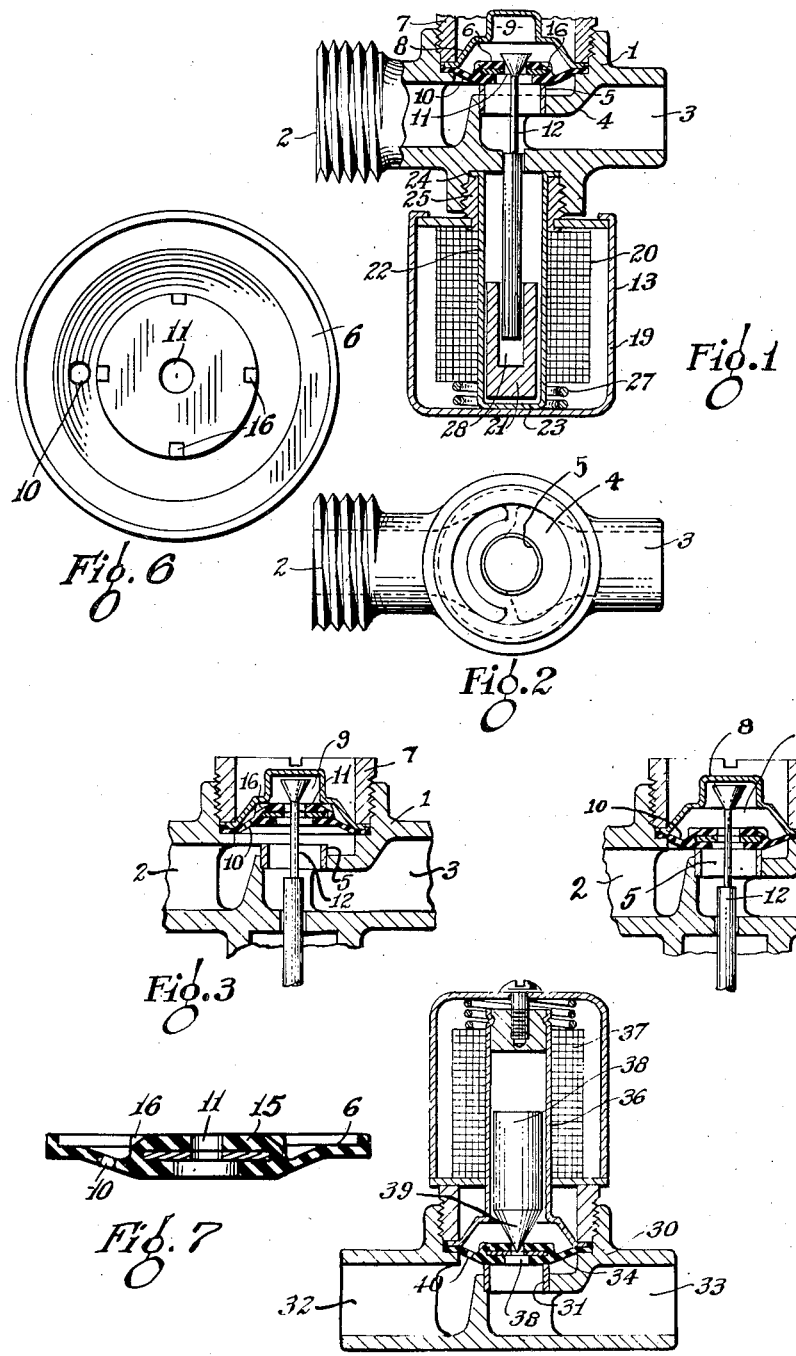
INVENTOR.
GEORGE C. FIELDS.
BY
Donald W. Farrington ATTORNEY Patented Dec. 15, 1942

2,305,151

UNITED STATES PATENT OFFICE 2,305,151

VALVE

George C. Fields, Euclid, Ohio

Application August 27, 1940, Serial No. 354,344

4 Claims. (Cl. 137—139)

This invention relates to valves and more particularly that type of valve wherein the fluid pressure is utilized to assist in opening and closing the valve.

It is among the objects of my invention to provide a valve having an inlet and outlet with a port therebetween, wherein the port is closed by a flexible diaphragm adapted to be moved by fluid pressure in the valve.

It is a further object of my invention to provide a valve according to the preceding object, wherein the diaphragm seats directly against the port and the movement of the diaphragm toward or away from the port is effected by the pressure of the fluid entering the valve.

It is a further object of my invention to provide a valve according to the preceding objects, in which the control of the fluid pressure actuating the diaphragm is effected through a solenoid.

It is also an object of my invention to provide a solenoid actuated valve, wherein the solenoid is provided with a metal cover or casing proportioned to carry the magnetic field produced by the energization of the solenoid windings.

It is also an object of my invention to provide a valve having a flexible diaphragm adapted to open or close a port in the valve, and wherein a manually-actuated member for moving the diaphragm is sealed by the diaphragm with respect to the fluid in the valve.

Further objects and advantages relating to simplicity in construction and economy of manufacture will appear from the following description and appended drawing, wherein:

Figure 1 is a sectional view of a valve and solenoid assembly made according to my invention;

Figure 2 is a plan view of a valve body with the diaphragm therefor removed;

Figure 3 is a sectional view showing a valve in its open position;

Figure 4 is a sectional view showing the position of the parts of the valve at the initiation of the valve opening;

Figure 5 is a modified form of the valve and solenoid assembly;

Figure 6 is an enlarged plan view of the diaphragm employed in a valve of my invention;

Figure 7 is a sectional view of the diaphragm shown in Figure 6.

Numerous attempts have been made to provide a valve having a large unrestricted open port area therein, which valve may be opened and closed by a solenoid or similar actuating device which is capable of asserting a light actuating force for a limited period of time.

Among the difficulties experienced in making a valve that will answer such requirements is that in opening the valve it is ordinarily necessary to move a valve closure member away from a valve port against the fluid pressure entering the valve. Where the port is small in cross-section and the fluid pressure relatively low, it is possible to move the valve closure member away from the seat or port with a solenoid. However, where the pressure is high or the port large, the load imposed upon the solenoid is frequently such that the solenoid cannot open the valve and results in a burning out of the solenoid.

According to my invention, I propose that the solenoid shall be utilized to move a member of relatively small cross-section against the fluid pressure in the valve and to utilize the fluid pressure to accomplish the major portion of the valve opening function. Thus, according to my invention, I may open a relatively large port against a relatively high head pressure by means of a solenoid which may be less powerful than the solenoid that would be required to open a port of the same area, wherein the valve is constructed according to the teachings of the prior art.

In the embodiment of my invention shown in Figure 1, a valve body indicated in its entirety as at 1 is provided with an inlet or high-pressure side opening at 2 and an outlet or low-pressure side as at 3. The high and low pressure sides 2 and 3 are separated from each other by an integrally cast wall portion 4 within the valve body and the wall 4 is provided with an opening or port having a seat 5 therein in the form of a ring.

A flexible diaphragm made of rubber, synthetic rubber or the like, as at 6, is mounted in the valve body in alignment with the valve port or seat opening 5. The edges of the diaphragm are securely clamped in the position shown by a ring-shaped nut 7. A cap 8 is inserted between the nut 7 and the upper side of the diaphragm to form a chamber 9. The diaphragm is apertured as at 10 and 11, the aperture 10 remaining open throughout the operation of the valve and the aperture 11 being adapted to be closed by a pilot valve 12, which in turn is controlled by the solenoid 13.

As shown in Figure 7, the diaphragm is reinforced in its central portion by a metal washer or the like 15 and is normally molded as indicated in Figures 6 and 7, so that the central portion of the diaphragm is in a lower plane than the edges thereof which are secured in the valve body. The upper surface of the central portion of the diaphragm is suitably notched as at 16 to permit the fluid passage therethrough as more fully described hereinafter.

Preferably the solenoid which is utilized to actuate the pilot valve 12 comprises an outer casing member 19, a field coil 20, an armature 21, and a closure for the casing including a sleeve or cup 22 within which the armature 21 operates. The field coil is resiliently maintained in its raised position within the casing by a coil spring 27. The connection between the armature 21 and the stem of the pilot valve 12 provides lost motion as at 28 so that the pilot valve is opened by the impact of the armature in motion.

According to my invention the casing 19 should be proportioned as to cross-section and should be made of such metal that the casing can carry or conduct the magnetic field produced by the energization of the coil. For instance, if the armature has a certain cross-sectional area and is of a certain metal, the casing (if made of the same metal) should have a cross-sectional area equal to or greater than the cross-sectional area of the armature.

In the event that the walls of the casing 13 are very thin or are of a metal having adverse magnetic flux characteristics compared to the metal of the armature 21 and the field coil, the solenoid in its entirety will heat up during use.

On the other hand, if the armature and casing of the solenoid are formed of the same material, and the cross-sectional area of the casing for the solenoid is equal to or exceeds the cross-sectional area of the armature, the solenoid will not heat excessively during use and therefore the valve may be maintained open for a long period of time.

In the operation of the valve made according to the preferred embodiment illustrated in Figures 1 to 4, the high-pressure side or that portion of the valve indicated at 2 is connected to a fluid supply and with the valve parts in the position shown in Figure 1, the fluid flows through the diaphragm aperture 10 into the diaphragm chamber 9. There being little or no pressure on the outlet side of the valve 3, the fluid pressure in the chamber 9 holds the pilot valve 12 in its seated position as shown. When, however, the solenoid 13 is energized by passing a current through the solenoid field winding 20, the armature 21 will be moved upwardly and carry the pilot valve member 12 to a position as indicated in Figure 4. As soon as the armature and the pilot valve 12 carried thereby are moved to the position indicated in Figure 4, the fluid under pressure in the chamber 9 flows out through the diaphragm opening 11 and into the low side 3 of the valve. As the chamber 9 is being relieved of the fluid pressure therein through the opening 11, the fluid pressure in the high pressure side of the valve is effective on the lower side of the flexible diaphragm to force the diaphragm upwardly away from its seated position on the ring 5 and thus the diaphragm assumes the position shown in Figure 3. The valve remains in this open position as long as the solenoid is energized so as to maintain the pilot valve 12 in its upper position.

While the parts are in the position shown in Figure 3, it will be observed that the opening 11 at the center of the diaphragm is over the port 5 and is thus adjacent to a low-pressure fluid zone, whereas the opening 10 of the diaphragm is adjacent a higher pressure fluid zone. Thus, while the valve is open as in Figure 3, fluid may flow from the chamber 9 downwardly through the opening 11 and through the port 5 and at the same time fluid may flow through the opening 10, thence through the notch 16 into the chamber 9. When, however, the pilot valve 12 is lowered to seat in the diaphragm opening 11, the flow of fluid out of the chamber 9 is interrupted, a fluid pressure zone of lower pressure occurs beneath the center of the diaphragm and fluid at a higher pressure continues to flow through the opening 10, thence through 16 and into the chamber 9, so as to force the diaphragm downwardly and seat the same against the port ring 5.

Although I have shown in the preferred form of my invention the diaphragm opening 11 as being larger than the diaphragm opening 10, I am aware that the sizes of these openings may be varied within relatively wide limits and that the openings in communication with the high pressure side may exceed the size of the openings leading to the low-pressure side without appreciably changing the general operation of the valve. The location of the openings in the diaphragm and their size with respect to the size of the port may also be varied as long as certain of said openings are adjacent a low-pressure zone and other of said openings are adjacent high-pressure zones in the fluid path.

It will be observed that with the valve and solenoid arrangement of the preferred embodiment (Figures 1 to 4) the opening through the valve body in which the pilot valve 12 operates is on the low-pressure or outlet side of the valve and thus when the valve is in closed position there is little or no fluid pressure on any of the connections between the solenoid and the valve body.

It will also be observed that the preferred construction requires a threaded opening into the valve body at each side of the port. In Figure 5 I have illustrated an alternative arrangement which may be better suited for some installations and in this modified form only one threaded opening is required in the valve body for the diaphragm and its actuating mechanism.

The valve body indicated in its entirety as at 30 is provided with a port ring 31 between the inlet or high-pressure side 32 and the outlet or low-pressure side 33. A diaphragm 34, substantially like that employed in the preferred form, is arranged above the port ring 31 and the chamber above the diaphragm indicated at 35 is formed in part by the sleeve 36 which extends upwardly within the solenoid 37. When the solenoid is energized the armature 38 thereof tends to be raised by the solenoid field coil and the point 39 carried by the armature constitutes the pilot valve adapted to be seated in the diaphragm opening 38. The diaphragm is provided with the opening 40 and is designed to open and close the port 31 by fluid pressure substantially in the manner as described in connection with the preferred embodiment.

It will be understood that the solenoid casing in this modification is proportioned with respect to the solenoid armature and field coil so that the casing can carry all of the magnetic field produced by the coil substantially as described in connection with the preferred form.

It will also be understood by those skilled in the art that although the valves in Figures 1 to 5 are illustrated as being operated by a solenoid, the pilot valve member may be actuated by suitable manual controls.

Valves made according to my invention are especially well suited for use with liquids, but the term fluid as used herein is intended to include and apply to gas, vapor and the like.

Although I have shown different forms of my invention and have described the same in considerable detail, it will be appreciated that numerous colorable changes may be made therein without departing from the scope of the invention as defined in the following claims.

I claim:

1. A valve comprising a body having an inlet and outlet, a port between said inlet and outlet, a chamber closed at one end opposite said port, said chamber having a conical base portion and a cylindrical cap portion joined to each other by a shoulder portion, a flexible diaphragm mounted between said port and chamber and adapted to be moved against the edges of the port to close the same and away from the port into said chamber to open said port and assume a position in contact with said shoulder portion in a manner to prevent the flow of liquid between the diaphragm and said shoulder portion, said diaphragm comprising an annular section aligned with the said conical base portion of the chamber and a central section aligned with said shoulder portion and cap portion, said annular section having an opening to lead fluid pressure from the port side of the diaphragm into said chamber, said central section provided with a pilot valve opening having an area exceeding the area of the opening in said annular section, a pilot valve associated with said opening and means on that side of the diaphragm remote from the port forming a passageway to conduct fluid pressure from said first named opening to the cap portion of said chamber when the diaphragm is moved away from the port into contact with said shoulder.

2. A valve comprising a body having an inlet and outlet, a port therebetween, a chamber closed at one end opposite said port, said chamber having a base portion and a cap portion, a diaphragm mounted between said port and chamber and adapted to be moved against said port to close the same and away from said portion into contact with the chamber wall in a manner to prevent the flow of liquid between the diaphragm and the chamber wall to open the port, said diaphragm comprising an apertured central section aligned with said cap portion and an apertured annular section aligned with said base portion, the area of the aperture of the central section exceeding the area of the aperture in the annular section, a pilot valve associated with said central aperture having a head on that side of the diaphragm remote from the port, said head having a diameter less than the diameter of said cap portion, whereby the head of said pilot valve may be moved into said cap portion free of said central section, said central section being restrained from movement with the pilot valve by engagement of said central section with the base portion of said chamber and a passageway formed in the diaphragm on that side thereof remote from the port to lead fluid pressure from the aperture in said annular section into said cap portion.

3. A valve comprising a body having an inlet, an outlet and a port, a flexible diaphragm arranged to be moved against said port to close the same and away from said port to open the port, a diaphragm cover secured to the valve body on that side of the diaphragm remote from the port, said cover having a cap portion coaxial with said port, said diaphragm having an apertured, rigid, central section having a diameter exceeding the diameter of said cap portion, a pilot valve arranged to seat in the aperture of said central diaphragm section, a flexible annular section integrally formed with said central section provided with an aperture having an area exceeded by the area of the aperture of said central portion and a passageway on that side of the diaphragm remote from the port to lead fluid pressure from the aperture in the annular section to said cap portion when the diaphragm is moved away from the port and into contact with the cover wall in a manner to prevent the flow of fluid between the diaphragm and the cover wall by fluid pressure.

4. A valve comprising a body having an inlet, outlet and port therebetween, a diaphragm adapted to close said port, a diaphragm cover encompassing said diaphragm, said cover having a base portion and a cap portion joined to each other by a backing plate portion, said diaphragm having a central section with a diameter corresponding to the diameter of said backing plate portion, a pilot valve aperture formed centrally of said diaphragm, a pilot valve associated with said aperture, said diaphragm having a flexible section intermediate the edges of the diaphragm and said central section, an aperture in said flexing portion having an area exceeded by said pilot valve aperture and a passageway formed in that side of the diaphragm adjacent the cover wall to lead fluid pressure from said last-named opening into the cap portion of said cover.

GEORGE C. FIELDS.